US011423206B2

(12) United States Patent
Kraus et al.

(10) Patent No.: US 11,423,206 B2
(45) Date of Patent: Aug. 23, 2022

(54) TEXT STYLE AND EMPHASIS SUGGESTIONS

(71) Applicant: ADOBE INC., San Jose, CA (US)

(72) Inventors: William Frederick Kraus, Bainbridge Island, WA (US); Nathaniel Joseph Grabaskas, Cupertino, CA (US); Ajinkya Kale, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/090,055

(22) Filed: Nov. 5, 2020

(65) Prior Publication Data
US 2022/0138402 A1    May 5, 2022

(51) Int. Cl.
*G06F 40/109*   (2020.01)
*G06N 3/08*   (2006.01)
*G06T 11/60*   (2006.01)
*G06F 40/237*   (2020.01)
*G06F 40/30*   (2020.01)

(52) U.S. Cl.
CPC .......... *G06F 40/109* (2020.01); *G06F 40/237* (2020.01); *G06F 40/30* (2020.01); *G06N 3/08* (2013.01); *G06T 11/60* (2013.01)

(58) Field of Classification Search
CPC ...... G06F 40/109; G06F 40/237; G06F 40/30; G06T 11/60; G06N 3/08
USPC ................................................. 715/269, 834
See application file for complete search history.

(56) References Cited

U.S. PATENT DOCUMENTS

| 8,164,596 | B1* | 4/2012 | Bech | G06T 13/00 |
| | | | | 345/473 |
| 9,715,484 | B1* | 7/2017 | Joshi | G06F 40/109 |
| 9,940,744 | B2* | 4/2018 | Borson | G06K 9/6201 |
| 10,732,782 | B1* | 8/2020 | Krivopaltsev | G06F 16/955 |
| 10,955,999 | B2* | 3/2021 | Lotinsky | G06T 11/60 |
| 11,159,631 | B2* | 10/2021 | Barajas Gonzalez | |
| | | | | G06F 16/215 |
| 2002/0100016 | A1* | 7/2002 | Van De Vanter | G06F 8/33 |
| | | | | 717/113 |
| 2008/0238927 | A1* | 10/2008 | Mansfield | G06T 11/60 |
| | | | | 345/467 |

(Continued)

OTHER PUBLICATIONS

McInnes, L., Healy, J., & Melville, J.; 2018; Umap: Uniform Manifold Approximation and Projection for Dimension Reduction; arXiv preprint arXiv:1802.03426; pp. 1-63.*

*Primary Examiner* — Andrew R Dyer
(74) *Attorney, Agent, or Firm* — Shook, Hardy & Bacon L.L.P.

(57) ABSTRACT

Embodiments provide systems, methods, and computer storage media for text style suggestions and/or text emphasis suggestions. In an example embodiment, an electronic design application provides a text style suggestion tool that generates text style suggestions to stylize a selected text element based on the context of the design. A text emphasis tool allows a user to select a text element and generate text emphasis suggestions for which words should be emphasized with a different text styling. Various interaction elements allow the user to iterate through the suggestions. For example, a set of style suggestions may be mapped to successive rotational increments around a style wheel, and as the user rotates through the positions on the style wheel, a corresponding text style suggestion is previewed and/or applied.

20 Claims, 8 Drawing Sheets

(56) References Cited

U.S. PATENT DOCUMENTS

| | | | |
|---|---|---|---|
| 2015/0205455 A1* | 7/2015 | Shaw | G06F 3/04842 |
| | | | 715/834 |
| 2017/0344519 A1* | 11/2017 | Scott | G06F 40/109 |
| 2019/0096034 A1* | 3/2019 | Niu | G06K 9/6215 |
| 2019/0243875 A1* | 8/2019 | Jain | G06K 9/6271 |
| 2019/0243890 A1* | 8/2019 | Kwatra | G06F 40/274 |
| 2020/0073936 A1* | 3/2020 | Jankowski | G06F 40/109 |
| 2020/0219274 A1* | 7/2020 | Afridi | G06K 9/6259 |
| 2020/0293608 A1* | 9/2020 | Nelson | G06F 40/30 |
| 2020/0301950 A1* | 9/2020 | Lorrain-Hale | G06F 16/3323 |
| 2021/0042383 A1* | 2/2021 | Feigenblat | G06N 3/08 |
| 2021/0056956 A1* | 2/2021 | Dimitriadis | G10L 15/1815 |

* cited by examiner

400

NOUNS | ROOT

REPETITIVE PAIRS | SUBJECT

ACTION VERBS | ACTION VERBS

*FIG. 4.*

TEXT STYLE AND EMPHASIS SUGGESTIONS

BACKGROUND

Typography—the way words within a text phrase are visually styled—is an important design element, as typography can provide clarity and nuance to the meaning, voice, and emotion of a phrase. The use of text styling to emphasize certain words within a text phrase mirrors intonation and phonetic stress in speech. For example, consider the phrase "The beach you should be sitting on now." The focus of the phrase changes between "The beach YOU should be sitting on now," where the emphasis is on the actor, and "The beach you should be sitting on NOW," where the emphasis is on the time frame. Not only can visual stylization of text and emphasis of particular words influence semantic meaning, they can also affect cognition and how easy it is to communicate and understand an intended meaning.

SUMMARY

Embodiments of the present invention are directed to generation of text style suggestions and/or text emphasis suggestions for electronic designs. In an example embodiment, an electronic design application provides a text style suggestion tool that generates text style suggestions to stylize a selected text element based on the context of the design. Additionally or alternatively, a text emphasis tool allows a user to select a text element and generate text emphasis suggestions for which words should be emphasized with a different text styling.

With respect to text style suggestions, in some embodiments, a text style suggestion tool extracts or otherwise collects metadata about a selected text element and an electronic design and sends the metadata with a call to a text style suggestion service, which returns a set of text style suggestions responsive to the metadata. For example, the text style suggestion service may use a neural network to rank text styles in terms of compatibility with the context represented by the metadata. In some embodiments, rather than selecting from a complete collection of text styles, the collection is compressed into a set of representative styles, and the selection is made from the set of representative styles. Upon receiving a set of text style suggestions from the text style suggestion service, the text style suggestion tool may perform a contextual analysis by simulating application of the text style suggestions to the selected text element and curating a set of contextual text style suggestions based on detected collisions, alignment, and readability. An interaction element such as a style wheel may be provided that accepts inputs iterating through the text style suggestions. In an example embodiment, a set of text style suggestions to successive rotational increments around the style wheel, and as the user rotates through the positions on the style wheel, a corresponding text style suggestion is previewed and/or applied. As such, a user may explore the text style suggestions and select a desired text style from the suggestions.

With respect to text emphasis suggestions, in some embodiments, a text emphasis suggestion tool generates or retrieves text emphasis suggestions by sending a text string from a selected text element with a call to a text emphasis service. The text emphasis service triggers (e.g., an external) natural language processing service to detect linguistic features of words and tokens in the text string, and the text emphasis service applies a decision tree that examines the linguistic features to assign applicable emphasis categories from a taxonomy to corresponding words in the text string. The text emphasis service returns a representation of applicable emphasis categories and corresponding words as text emphasis suggestions, and an interaction element may be provided that accepts inputs iterating through the text emphasis suggestions. As such, a user may preview and select a desired text emphasis from the suggestions.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 4 illustrates some example text emphasis suggestions and corresponding emphasis categories, in accordance with some embodiments;

DETAILED DESCRIPTION

Overview

Figure 1:
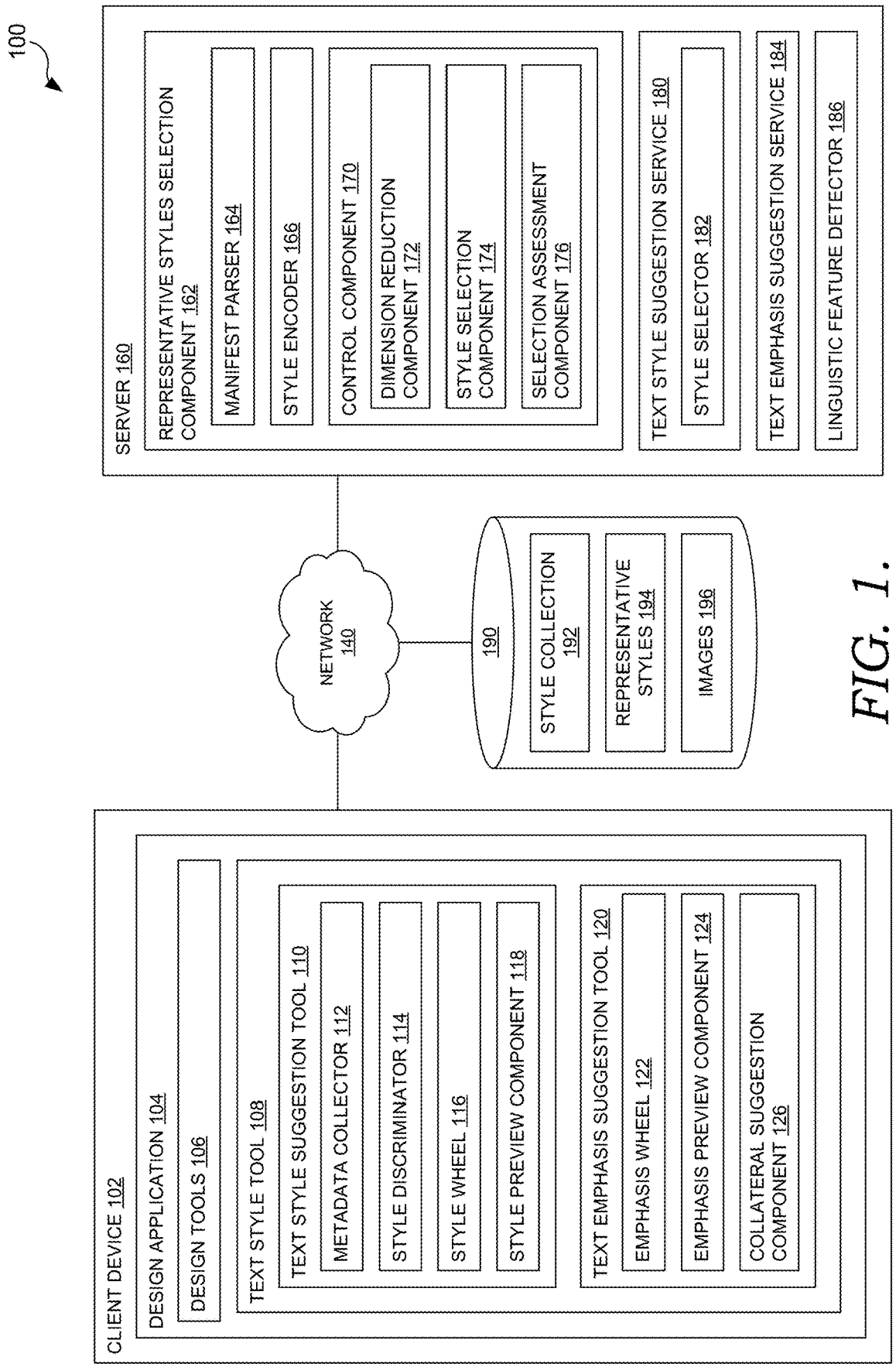
FIG. 1 is a block diagram of an example computing system for generating text style and emphasis suggestions, in accordance with some embodiments.

There are many elements of visual stylization that can be applied to text or a text field, including font face, font color, point size, line spacing (leading), letter spacing (tracking and kerning), text position, line or field length, text background, and other effects, to name a few. A number of design applications allow users to explore large collections of template text styles, or create and edit their own text styles. As a result, the number of text styles in many style collections has grown substantially. However, large collections of styles are difficult to explore. For example, many users do not know exactly what style they are looking for, or may not know how to characterize a desired style with a suitable search term. The alternative to targeted searching is manually exploring large collections, which can be tedious, as many styles in large collections tend to be visually similar. For novice designers, the depth and variation of available styles may be overwhelming, or may be hidden within unfamiliar menus.

Accordingly, embodiments of the present invention are directed to techniques for generating text style and emphasis suggestions. In an example embodiment, an electronic design application provides access to a style suggestion service and/or an emphasis suggestion service. A user initially creates or selects an electronic design, selects a text element from the design, and activates a style and/or emphasis suggestion tool. Depending on the tool being invoked, the tool accesses and encodes a representation of the selected text element and/or its context in the design and calls a corresponding suggestion service, which returns a representation of style and/or emphasis suggestions targeted to the user's design. The user may then iterate through the suggestions in various ways. For example, an interaction element such as a style wheel may allow the user to scroll through text style and/or emphasis suggestions by rotating the wheel through successive positions that map to the different suggestions. Additionally or alternatively, an interaction element such as a button may allow the user to scroll through suggestions by clicking the button to advance to successive suggestions. Selected suggestions may be previewed and/or applied in the user's design. In some embodiments, a suggestion service is re-called when the suggestions run out or when the user changes the design, to generate more suggestions. As such, users can quickly navigate through the most relevant style and emphasis suggestions and discover a collection of style features (e.g., font, color, backing shape) that go well together, without needing to be familiar with a large collection of supported styles, and without needing extensive knowledge of the design application and its menus. Thus, even amateur users can communicate effectively with their intended audiences and create visually stunning graphic designs with increased creation velocity over prior techniques.

In order to support text style suggestions, in some embodiments, a large collection of text styles is encoded and reduced to a more manageable subset of substantially unique styles. In some embodiments, each text style in a collection is encoded into a multi-dimensional representation by encoding different style features into different dimensions. In some implementations that support primary and secondary text styles for a particular text element, two-hot encoding is used to represent the style features for the primary and secondary styles (e.g., the same font being used twice receives a higher value than if it is only used once). In an example embodiment, dimensionality reduction is applied to the encoded text styles, the encoded text styles are clustered and their centers identified, and the resulting set of cluster centers are taken as a compressed set of representative text styles.

In some embodiments, the process is repeated using varied parameters for dimensionality reduction and/or clustering to generate multiple candidate compressed sets of representative text styles, and each candidate compressed set is evaluated to determine a score that quantifies how much the candidate compressed set reduced the original collection and/or how much of the original collection is covered by the candidate compressed set (e.g., using any known distance or similarity metric to compute distribution similarity, percentage of original styles within a cluster or within a threshold distance from a cluster center in the reduced set, percentage of instances of style features appearing in the original set compared to the compressed set). The candidate compressed set with the best score (e.g., greatest reduction and/or most coverage) is selected as a compressed set of representative text styles, which represent substantially unique styles in the collection. In some embodiments, compressed set of representative text styles is generated for each semantic role for text (e.g., title, subtitle, body, informative, call to action, etc.) represented in the collection of text styles.

As such, a compressed set of representative text styles(s) may be used in lieu of the complete set of text styles to enable a more efficient search and exploration of the design space represented by the text styles. For example, suppose a collection of text styles includes 50,000 stylized text elements created by various designers. This set can be reduced (e.g., down to just a few thousand substantially unique styles), which can further be filtered by text role and/or other features to generate a smaller yet diverse set of style options, which the user may then explore. Thus, compression enables faster and more thorough exploration of a set of text styles.

In some embodiments, a user may invoke a text style suggestion service by selecting a particular text element and selecting a text style tool (e.g., a text style menu). Upon selection, the text style tool looks up, extracts, or otherwise collects metadata about the selected text element and the user's design, such as position in the design, font features (e.g., density, ornateness, etc.), derived features like variance in background color around the text element, the semantic role of the text element in the design, and/or other features. The text style tool sends the extracted metadata or a representation thereof to the text style suggestion service, which selects appropriate text styles from a collection of available text styles (e.g., from a compressed set of representative text styles). By way of nonlimiting example, the role of the selected text element may be used to identify a corresponding compressed set of representative text styles for that role, and a set of suggested styles may be selected from the compressed set (e.g., the top n ranked styles ranked by a neural network or other machine-learning model based on the extracted metadata, the top n most commonly selected styles). The text style suggestion service returns the selected text styles, and in some embodiments, a contextual analysis is performed to curate style suggestions that are compatible with the context of the user's design, for example, by selecting or modifying styles to avoid collisions with other design elements, match an existing design alignment, and ensure a threshold amount of readability (e.g., quantified based on font density, background color variance, contrast, point size). The user may iterate through the selected style suggestions to preview and/or apply the suggestions to the user's design.

In some implementations that support primary and secondary text styles for a particular text element, a text emphasis suggestion service is used to generate recommendations for which word or set of words within a selected text element (e.g., within a selected phrase) can be meaningfully emphasized with a different text style than the one applied to the other words in the text element (e.g., including altering the font, color, scale, orientation, and/or relative position of an emphasized word(s) within a text phrase). At a high level, given a selected text phrase, text emphasis suggestion service generates suggestions that identify words within that phrase that are candidates for emphasis (and therefore for application of different styling). In the vast majority of cases, any given phrase will have multiple ways to emphasize the text to focus the audience's attention on different semantic aspects of the phrase. As such, in some embodiments, the text emphasis suggestion service applies and/or triggers natural language processing to parse, analyze, and tag tokens of a selected text element, and a rules engine is used to assign suggested emphasis categories from a taxonomy that represents different types of semantic nuance and to associate the emphasis categories with corresponding words from the phrase.

In an example implementation of a set of emphasis rules, the text emphasis suggestion service makes a first pass of the text string from a selected text element in which each word in the text string is examined and assigned zero or more emphasis categories. In a subsequent pass of the text string, the service looks for more complex emphasis categories, such as recurring patterns of emphasis categories (e.g. pairs) or all words with a particular tag (e.g., all nouns). For example, the phrase "A small act of kindness makes a big difference" has a recurring pattern of [Adjective+Noun] found in "small act" and "big difference." This linguistic pattern may be identified and used to assign a corresponding emphasis category to the pair of terms in order to identify those words for emphasis (e.g., "A SMALL ACT of kindness makes a BIG DIFFERENCE").

The text style suggestion service identifies a representation of the identified emphasis categories and corresponding words, and returns the identified emphasis suggestions. In some embodiments, the user may iterate through the emphasis suggestions (e.g., using selected and/or suggested primary and secondary text styles) to preview and/or apply the suggestions to the user's design. In some embodiments, an interaction element allows a user to choose which words to apply primary and secondary styles.

Generally, emphasis suggestions may be used in a variety of ways, including visually arranging text in a graphic design (e.g., where the emphasis suggestions are used to determine which words should be highlighted with a different font styling, color, scaling, orientation, and/or relative position) and in non-visual design (e.g., inflection of an automated voice to draw attention to a particular aspect described by a phrase). In some embodiments, candidate words for styling are used to correlate a text element with other non-text assets in the same composition. For example, in the example given above, "The beach YOU should be sitting on now" might be associated with an image of a person on a beach, whereas "The beach you should be sitting on NOW" might be better expressed by an image of a sundial on a beach. More specifically, in some embodiments, candidate words for emphasis identified by an emphasis suggestion are used to search (e.g., metadata tags) for a background image or other non-text asset. In some embodiments, candidate words themselves are used as search terms, candidate words or tags are mapped to some other search terms, search terms are supplemented with words from a text phrase that have a determined relationship with the candidate words identified using natural language processing (e.g., to narrow a broad search for a word like "bat" to a more specific context like "Halloween"), and/or search terms are identified in other ways. Generally, leveraging natural language processing to recognize patterns, to recognize particular words in a phrase, and/or to associate emphasis with other collateral (e.g., emphasize "beach"→associate with image of beach; emphasize "sitting"→associate with image of a chair) offers significantly more intelligent suggestions than simply randomly cycling word options.

As such, using techniques described herein, even novice users can easily explore and visualize text style suggestions and/or text emphasis suggestions. In various embodiments, the present techniques recognize situations where aesthetically pleasing text styles can be applied, and recognize which words within a phrase to call out in order to communicate what the user wants to emphasize. These recognition capabilities improve the quality of recommendations over prior techniques. In some cases, the present techniques may be used to automatically generate designs or design elements without user intervention. In these cases, the user no longer needs to figure out a font, shape, arrangement, emphasis, or the like, as these decisions may be made for them by automatically mapping context to good design. Whether presenting suggestions as recommendations or automatically implementing a suggestion, the present techniques help users to identify appropriate text styles and/or text emphasis for their design as if an expert designer was guiding them, empowering users to create a polished and personalized design efficiently and effectively.

Example Text Suggestion Environment

Referring now to FIG. 1, a block diagram of example environment 100 suitable for use in implementing embodiments of the invention is shown. Generally, environment 100 is suitable for typographic design, and, among other things, facilitates generation of text style and/or text emphasis suggestions. Environment 100 includes client device 102 and server 160. Client device 102 and/or server 160 may be any kind of computing device capable of facilitating typographic design. For example, in an embodiment, client device 102 and/or server 160 are a computing device such as computing device 800, as described below with reference to FIG. 8. In various embodiments, client device 102 and/or server 160 may be a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Environment 100 also includes storage 190. Storage 190 generally stores information including data, data structures, computer instructions (e.g., software program instructions, routines, or services), and/or models (e.g., machine learning models) used in some embodiments of the technologies described herein. In an embodiment, storage 190 includes a data store (or computer data memory). Further, although depicted as a single data store component, storage 190 may be embodied as one or more data stores (e.g., a distributed storage network) and/or may be in the cloud. In some embodiments, some or all of the information depicted as part of storage 190 may additionally or alternatively be stored on client device 102 and/or server 160.

The components of environment 100 communicate with each other via a network 140, which may include, without limitation, one or more local area networks (LANs) and/or wide area networks (WANs). Such networking environments are commonplace in offices, enterprise-wide computer networks, intranets, and the Internet.

In the example illustrated in FIG. 1, client device 102 includes text style suggestion tool 110 and text emphasis suggestion tool 120, and server 160 includes text style suggestion service 180 and text emphasis suggestion service 184. Generally, any or all of these components may be incorporated, or integrated, into an application(s) (e.g., a corresponding application on client device 102 and server 160, respectively), or an add-on(s) or plug-in(s) to an application(s). The application(s) may generally be any application capable of facilitating typographic design, and may be a stand-alone application, a mobile application, a web application, or the like. In some implementations, the application(s) comprises a web application, which can run in a web browser, and could be hosted at least partially server-side. In some embodiments, the application(s) may include a dedicated application. In some cases, the application(s) can be integrated into an operating system (e.g., as a service). Some example applications that may be used for typographic design include ADOBE® Spark, ADOBE PHOTOSHOP®, ADOBE INDESIGN®, and ADOBE ILLUSTRATOR®, to name a few examples.

Generally, any allocation of functionality may be implemented across any number of devices. In the example illustrated in FIG. 1, text style suggestion tool 110 and text emphasis suggestion tool 120 are part of text style tool 108, which is included in design application 104 on client device 102. Furthermore, text style tool 108 invokes text style suggestion service 180 and text emphasis suggestion service 184, which reside on server 160 in this embodiment. In another embodiment, text style tool 108, text style suggestion service 180, and text emphasis suggestion service 184 (or some portion thereof) are integrated into a common application executable on a single device, or arranged and distributed across some other number of devices. Similarly, linguistic feature detector 186 is illustrated on server 160 in FIG. 1, but in other embodiments, linguistic feature detector 186 may be implemented on some other device (e.g., as a natural language processing service provided by another accessible server(s)). Generally, although some embodiments are described with respect to an application(s), any of the functionality described herein may additionally or alternatively be integrated into an operating system (e.g., as a service), a server (e.g., a remote server), a distributed computing environment (e.g., as a cloud service), and/or otherwise. These are just examples, and any suitable allocation of functionality among these or other devices may be implemented within the scope of the present disclosure.

To begin with a high-level overview of an example workflow through the configuration illustrated in FIG. 1, in some embodiments, representative styles selection component 162 of server accesses style collection 192 (e.g., from storage 190) and compresses it (e.g., by selecting a set of representative styles 194), which are made available design application 104 on client device 102. Generally, a user may use various design tools 106 of design application 104 to generate a design with any number and arrangement of text and/or graphic elements, and to apply desired styles (e.g., color, effects, animation, etc.) and other design elements. The user selects a text element (e.g., a text field that includes a text phrase) using a selection tool of design application 104, and activates text style tool 108 (e.g., a text style menu). Upon invocation of text style tool 108 with a selected text element, text style suggestion tool 110 makes a call to text style suggestion service 180 to retrieve context-specific text style suggestions, and/or text emphasis suggestion tool 120 makes a call to text emphasis suggestion service 184 to retrieve text emphasis suggestions (e.g., a list of emphasis categories to which the text phrase can belong, and which word(s) to emphasize for each emphasis category). In some embodiments, style discriminator 114 further curates the retrieved text style suggestions based on a contextual analysis of the current design. The user then iterates through the suggestions using a corresponding interaction element (e.g., style wheel 116 of text style suggestion tool 110, emphasis wheel 122 of text emphasis suggestion tool 120) to preview and/or apply a desired suggestion.

In some embodiments, representative styles selection component 162 compresses a collection of styles (e.g., style collection 192 from storage 190) into a compressed representation of substantially unique styles (e.g., representative styles 194). In the embodiment illustrated in FIG. 1, representative styles selection component 162 includes manifest parser 164, style encoder 166, and control component 170.

At a high-level, manifest parser 164 accesses a representation each style in the collection (e.g., a manifest for each style) and extracts style features for each style (e.g. parses the style features from each manifest), and style encoder 166 generates an encoded representation of each of style from the extracted style features. Control component 170 (iteratively) applies dimensionality reduction and clustering to identify one or more candidate compressed or reduced sets of representative styles (e.g., one for each distinct text role), which may be made available to design application 104 as representative styles 194 (e.g., for manual exploration using one of design tools 106, text style tool 108, or some other tool).

More specifically, style collection 192 may be represented by any number of data structures, files, or other ways of organizing information. In an example embodiment, each style (e.g., lockup, logo, other stylized text element) in style collection 192 is represented by its own design document (which stores a stylized text element) and/or a corresponding manifest that represents the design document and specifies the design elements in the document and their corresponding features (e.g., element size, element location, element content, font, color, effects, backing shapes, etc.). Manifest parser 164 parses and/or otherwise extracts a set of style features from the manifest for each style, and style encoder 166 generates an encoded representation of the style from the extracted style features. Generally, the method of parsing and/or extraction may depend on the structure of the manifest (e.g., field lookups, string matching or other type of extraction rule, etc.)

Generally, any set of style features may be extracted (e.g., from a template text element) and used to represent a particular text style. Some style features may be encoded into a value (e.g., an integer) that represents one of a limited number of states (e.g., a fixed number of alignment states), while other styles features may be encoded into a value (e.g., a floating-point number, optionally normalized) that represents a part of a range (e.g., font size). Example style features for a text style include text alignment (e.g., left, center, right, justified, rotated, scaled), backing attached to text (e.g., shape, opacity, padding between backing and text bounding box), character length, font, font size, line spacing (e.g., leading), letter spacing (e.g., tracking, kerning), opacity, semantic role of text, text opacity, other text effects (e.g., knockout, border, shadow), and/or others, whether for primary and/or secondary text styles.

Style encoder 166 generates an encoded representation of each style from the extracted style features. In some embodiments, style encoder 166 uses one-hot encoding or two-hot encoding. For example, in some implementations that support a single text style for a particular text element, one-hot encoding is used to map each style option to its own dimension. In some implementations that support both primary and secondary text styles for a particular text element, two-hot encoding is used to map each style option to its own feature column, which includes two values, one for the primary text style and one for the secondary text style. As such, style encoder 166 maps extracted style features to corresponding dimensions of a style encoding. For example, an extracted style feature represented by a floating-point value may be mapped to a corresponding dimension (or feature column). For an extracted style feature represented by an integer value, each possible integer value (state) for that feature may be mapped to a separate dimension (or feature column). In some embodiments, style encoder 166 normalizes and/or standardizes the style encodings using any known technique (e.g., StandardScaler, MinMaxScaler).

Control component 170 performs dimensionality reduction of the style encodings, selection of representative styles from the reduced style encodings, and/or assessment of the selection (e.g., based on amount of reduction and/or amount of coverage of the original collection). In some embodiments, control component 170 iteratively performs reduction, selection, and assessment to identify multiple candidate compressed sets of representative styles, and control component 170 chooses the candidate compressed set that best reduces the number of styles, while maintaining their feature distribution. In the example illustrated in FIG. 1, control component 170 includes dimension reduction component 172, style selection component 174, and selection assessment component 176.

Dimension reduction component 172 performs dimensionality reduction on the style encodings. Depending on the embodiment, each style encoding may be a multi-dimensional representation with a large number of dimensions (e.g., on the order of hundreds or more). As such, dimension reduction component 172 applies any known type of dimensionality reduction to each style encoding. Example dimensionality reduction techniques include Uniform Manifold Approximation and Projection (UMAP), Principal Component Analysis (PCA), t-Distributed Stochastic Neighbor Embedding (t-SNE), and others. In a non-limiting example embodiment, each 137-dimension style encoding is reduced to a two-dimensional representation.

Style selection component 174 identifies substantially independent groups of styles, for example, by clustering the reduced style encodings and choosing the encoding closest to each cluster center as the best representation of each group. Any clustering technique may be applied. In some embodiments, style selection component 174 applies Mean-Shift clustering, which attempts to maximize the density of clusters and locates the maximum from each cluster. The cluster maxima may be selected as a (candidate) compressed set of representative styles.

Selection assessment component 176 analyzes the compressed set of representative styles to quantify how well the compressed set represents the distribution of the original uncompressed set and/or how much the original set was compressed. In some embodiments, selection assessment component 176 computes a score that quantifies distribution similarity between the original and compressed sets and/or quantifies the amount of reduction (e.g., a reduction and match score). With respect to distribution similarity, in some embodiments, any known statistical similarity or distance metric may be applied to quantify distribution similarity or amount of coverage of the original collection by the compressed set. Additionally or alternatively, distribution similarity may be computed as a percentage of the original styles that fall within a cluster or within a threshold distance from a cluster center in the reduced set. In yet another example, distribution similarity may consider the number of instances of a particular text or style feature (e.g., number of fonts) in the original set compared to the reduced set. With respect to the amount of reduction, any suitable reduction metric may be applied, such as percentage reduction in number of styles. The distribution similarity and reduction metric may be combined (e.g., weighted) to compute an overall score (e.g., a reduction and match score) for the compressed set of representative styles.

In some embodiments, control component 170 repeats the process of reduction, selection, and assessment using varied parameters for dimensionality reduction and/or clustering to generate multiple candidate compressed sets of representative text styles. Selection assessment component 176 computes a score for each candidate compressed set, and the candidate compressed set with the best score (e.g., greatest reduction while maintaining the original distribution) is selected as the compressed set of representative text styles, which represent substantially unique styles in the collection. The compressed set of representative text styles (e.g., representative styles 194) may be represented in an index, table, dictionary, or other data structure(s) that identifies or maps to each representative text style (e.g., design document, template text element, manifest), the design elements in the representative text style, and/or their corresponding features (e.g., element size, element location, element content, font, color, effects, backing shapes, etc.).

In some embodiments, control component 170 initially sorts style encodings by semantic role (and/or some other text or style feature) and generates a compressed set of representative styles for each role (and/or other feature). In some embodiments, sorting may be performed by filtering the dimension(s) of the style encodings that represents the feature(s) to be filtered. Additionally or alternatively, each style encoding may be represented in an index, table, dictionary, or other data structure(s) that associates the style encoding with its corresponding text style (e.g., design document, template text element, manifest). In an example embodiment, an index maps each style encoding to its corresponding design document (e.g., keyed by a unique identifier or location of the design document) and/or one or more extracted style features, in which case, the index may be filtered by the field(s) that represent the feature(s) to be filtered. As such, control component 170 may initially sort style encodings by one or more features and generate a compressed set of representative styles for each feature.

Turning now to design application 104 on client device, a user may use any known type of design tool(s) 106 to select or generate a design with any number and arrangement of text and/or graphic elements, and to apply desired styles (e.g., color, effects, animation, etc.) and other design features. In some embodiments, one or more design tools 106 and/or text style tool 108 accept user inputs navigating, selecting, and applying text styles from representative styles 194 to a selected text element. As such, in some embodiments, a compressed set of representative text styles (e.g., representative styles 194) may be used in lieu of the complete set of text styles (e.g., style collection 192) to enable a more efficient search and exploration of the design space represented by the text styles.

Figure 2:
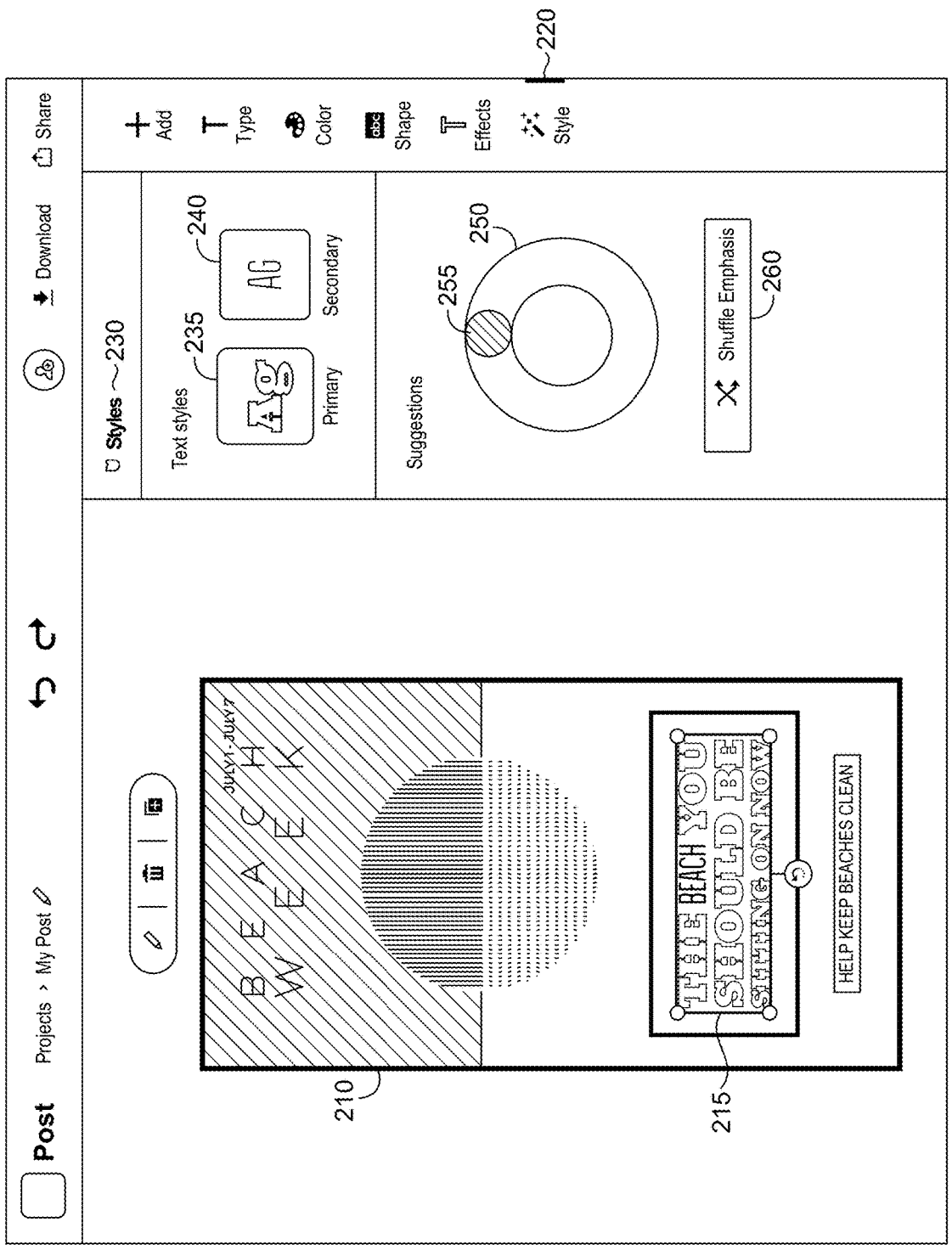
FIG. 2 illustrates an example user interface for generating text style and emphasis suggestions, in accordance with some embodiments.

In some embodiments, text style tool 108 causes a presentation in a user interface (e.g., a graphic user interface) of design application 104 of one or more interaction elements (e.g., in a text styles menu) that accept user inputs navigating, selecting, creating, editing, and/or applying text styles to a selected text element. For example, a selection tool of design application 104 may accept a selection of a particular text element in the user's design (e.g., a text field that includes a text phrase), and text style tool 108 may accept user input applying a text style to the selected text element. In some embodiments, text style tool 108 may present an indication of primary and secondary text styles to apply to different portions of the selected text element, and accept user input changing the primary and secondary text styles. Upon user selection of a particular text style, text style tool 108 may preview and/or apply the style to the user's design. FIG. 2 illustrates an example user interface 200 for generating text style and emphasis suggestions, in accordance with some embodiments. User interface 200 may be part of a design application (e.g., design application 104 of FIG. 1). In the example illustrated in FIG. 2, user interface 200 includes design 210 and selected text element 215. On the menu on the right, style icon 220 activates text styles menu 230, which accepts inputs selecting primary 235 and secondary 240 text styles. In some embodiments, the functionality of text styles menu 230 corresponds to text style tool 108 of FIG. 1.

In the embodiment illustrated in FIG. 1, text style tool 108 includes text style suggestion tool 110 and/or text emphasis suggestion tool 120. At a high level, text style suggestion tool 110 retrieves and/or selects context-specific text style suggestions (e.g., from representative styles 194), and previews and/or applies the text style suggestions to the user's design. Text emphasis suggestion tool 120 retrieves and/or selects text-specific emphasis suggestions, and previews and/or applies the text style suggestions to the user's design.

In FIG. 1, text style suggestion tool 110 includes metadata collector 112, style discriminator 114, style wheel 116, and style preview component 118. At a high-level, when invoked, text style suggestion tool 110 generates context-specific text style suggestions by collecting contextual metadata about a selected text element (e.g., metadata collector 112) and providing a representation of the collected metadata with a call to text style suggestion service 180. Upon receiving the call, text style suggestion service 180 (e.g., style selector 182 of text style suggestion service 180) identifies text style suggestions (e.g., from representative styles 194) based on the collected metadata and returns the identified text style suggestions to text style suggestion tool 110. In some embodiments, style discriminator 114 performs a contextual analysis of the selected text element to identify text style suggestions that are compatible with the context of the user's design. The identified compatible text styles are mapped to different positions of style wheel 116 (e.g., which may correspond to style wheel 250 of FIG. 2), and the user may scroll through the positions of style wheel 116 to iterate through the compatible style suggestions. Upon selection of a particular text style suggestion (e.g., corresponding to the position of indicator 255 of style wheel 250 of FIG. 2), style preview component previews and/or applies the text suggestion to the user's design.

In some embodiments, generation of text style suggestions is triggered upon invocation of text style tool 108 and/or text style suggestion tool 110. For example with respect to FIG. 2, the suggestion generation process of text style suggestion tool 110 may be triggered (e.g., by text style tool 108) when a user selects style icon 220 to open text styles menu 230. In other embodiments, generation of text style suggestions is triggered without any user interaction or involvement (e.g., upon initializing or loading a particular design). Upon invocation, metadata collector 112 looks up, extracts, or otherwise collects metadata about the selected text element and the user's design, such as position in the design, font features (e.g., density, ornateness, etc.), derived features like variance in background color around the text element, the semantic role of the text element in the design, and/or other features. Upon collection of the metadata, text style suggestion tool 110 sends a representation of the collected metadata with a call to text style suggestion service 180 requesting text style suggestions.

Upon receipt of a request for text style suggestions, text style suggestion service 180 packages a representation of the collected metadata and one or more candidate style suggestions (e.g., from style collection 192, representative styles 194) and feeds the representation(s) into style selector 182, which selects a designated number of text styles to match the request (e.g., the collected metadata). Generally, style selector 182 may use any suitable technique for selecting designated number of text styles from a collection. In an example embodiment usage of text styles is tracked over a plurality of users, and style selector 182 selects and returns the top n most frequently used text styles.

Additionally or alternative, in some embodiments, style selector 182 includes one or more neural networks or some other machine-learning model configured to predict a compatibility score for each candidate style based on encoded contextual metadata from the request. In an example architecture, a neural network is configured and trained to predict a compatibility score for each candidate text style (e.g., one score per output neuron) from an encoded representation of contextual metadata. In this example, text style suggestion service 180 may receive the contextual metadata as part of a request, generate an input vector that encodes the contextual metadata, activate the neural network of style selector 182 to generate compatibility scores, identify the top n scores, and return a list or other representation of the corresponding top n text style suggestions.

In another example, text style suggestion service 180 may receive the contextual metadata as part of a request, identify the semantic role of the selected text element from the collected metadata, and trigger selection of text styles from a set text styles specific to the identified semantic role (e.g., a compressed set of representative text styles for that role). In some cases, a single neural network may be used to predict compatibility scores for all text styles in a collection, and the top styles may be selected from the text styles with the same role. In other cases, separate neural networks may be trained for different subsets of a text style collection (e.g., a subset per role or other feature), and a neural network specifically configured and trained to predict compatible text styles for a given role or other feature (e.g., one output neuron for each available text style for a given role) may be selected and activated. These are just a few examples, and other implementations are contemplated within the scope of the present disclosure.

Generally, text style suggestion service 180 returns a list or other representation of text styles to text style suggestion tool 110. In some embodiments, upon receipt, style discriminator 114 performs a contextual analysis of the selected text element to identify a subset of the text style suggestions that are compatible with the context of the user's design. Generally, in embodiments where text style suggestion service 180 is remote from design application 104 (e.g., available as a cloud service), it may be desirable to limit the amount of metadata transmitted to the service to improve performance (e.g., speed of execution). As a result, some or all of a contextual analysis may be performed at the client device.

More specifically, in an example embodiment, style discriminator 114 evaluates each received text style suggestion (candidate text style suggestion) by simulating application of each candidate text style suggestion. For example, style discriminator 114 may perform shape collection detection and quantify an amount of collision between the selected element with the candidate text style suggestion applied and other elements in the user's design. Suggestions that result in a collision (e.g., more than a threshold intersection area or percentage, more than a relative threshold based on existing collisions prior to stylization) may be omitted or modified to comply with a collision threshold. In some embodiments, style discriminator 114 may perform alignment detection on the user's design, compare the detected alignment with a candidate text style suggestion, and omit suggestions that do not match or modify suggestions to match the detected alignment.

Additionally or alternatively, style discriminator 114 may quantify readability of a candidate text style suggestion applied to a selected text element. In some embodiments, style discriminator 114 computes a readability score for each candidate text style suggestion, for example, based on font density, background color variance, contrast, point size, and/or other features. In an example embodiment, density is computed as font area to perimeter ratio, contrast is computed as text to background contrast, background color variance is computed across some number of points (e.g., 256), point size is computed as average point size of font, and readability score is computed as (density*(contrast/variance))*size. Style discriminator 114 may compute readability scores for each candidate text style suggestion, apply a readability threshold (e.g., absolute, relative to existing readability prior to stylization), and omit suggestions that do not meet the threshold or modify non-compliant suggestions to meet the threshold. These are just a few examples, and other ways of curating candidate text style suggestions into a set of context-specific text style suggestions may be implemented within the scope of the present disclosure.

Figure 3:
FIG. 3 illustrates some example text style suggestions, in accordance with some embodiments.

Generally, an interaction element provided by text style suggestion tool 110 may allow a user to iterate through the text style suggestions. For example, in the embodiment illustrated in FIG. 1, style wheel 116 may map the text style suggestions to corresponding positions around the wheel. A user can change the current position on the wheel in various ways. For example, with respect to FIG. 2, style wheel 250 may support iterating through positions by dragging and dropping indicator 255 to a new position around the wheel, scrolling a mouse wheel (e.g., while hovering over style wheel 250, text styles menu 230, or some portion thereof), and/or other examples. As the user scrolls through the position of the style wheel to iterate through compatible text style suggestions, style preview component 118 of FIG. 1 previews and/or applies the text suggestion to the user's design. FIG. 3 illustrates some example text style suggestions, in accordance with some embodiments.

For example and returning to FIG. 1, when indicator 255 is in a baseline position of style wheel 250 (e.g., 12 o'clock), style preview component 118 may maintain the original stylization of selected text element 215. When indicator 255 is advanced to successive rotational increments around style wheel 250, style preview component 118 applies a corresponding text style suggestion to selected text element 215. In some embodiments, when the user rotates style wheel 250 back through previous positions of indicator 255, style preview component 118 applies the previous text styles associated with the previous positions. For example, returning indicator 255 to the baseline position may cause style preview component 118 to apply the original stylization to selected text element 215. In some embodiments, when the suggestions run out or when the user changes the design, text style suggestion tool 110 generates new suggestions, for example, by re-calling text style suggestion service 180. This is just an example, and other interaction elements may additionally or alternatively be provided to allow a user to iterate through text style suggestions.

Turning now to text emphasis suggestions, in the embodiment illustrated in FIG. 1, text emphasis suggestion tool 120 includes emphasis wheel 122, emphasis preview component 124, and collateral suggestion component 126. At a high-level, when invoked, text emphasis suggestion tool 120 retrieves text-specific emphasis suggestions by providing a representation of a selected text element (e.g., a text string) with a call to text emphasis suggestion service 184, which identifies and returns emphasis suggestions comprising emphasis categories and corresponding word(s) in the text string to be emphasized (e.g., by applying a different text style). Upon receipt, an interaction element of text emphasis suggestion tool 120 may accept user input iterating through the emphasis suggestions to preview and/or apply the suggestions to the user's design (e.g., by applying selected and/or suggested primary and secondary text styles). In some embodiments, separate interaction elements are provided for text style and emphasis suggestions. In other embodiments, a single interaction element simultaneously iterates through both lists of suggestions. In the embodiment illustrated in FIG. 1, text emphasis suggestion tool 120 provides an emphasis wheel 122 that allows a user to scroll through the emphasis suggestions in an analogous manner as style wheel 116. In the embodiment illustrated in FIG. 2, text styles menu 230 provides a shuffle emphasis button 260 that advances through the emphasis suggestions with each activation.

In some embodiments, generation of text emphasis suggestions is triggered upon invocation of text style tool 108 and/or text emphasis suggestion tool 120. For example with respect to FIG. 2, the suggestion generation process of text emphasis suggestion tool 120 may be triggered (e.g., by text style tool 108) when a user selects style icon 220 to open text styles menu 230. In other embodiments, generation of text emphasis suggestions is triggered without any user interaction or involvement (e.g., upon initializing or loading a particular design). Upon invocation, text emphasis suggestion tool 120 calls text emphasis service 184 and provides the service with a representation of a selected text phrase from a text element (e.g., a text string).

Upon receipt of a request for text emphasis suggestions, text emphasis suggestion service 184 generates suggestions for which words in the received text phrase can be emphasized in a semantically meaningful way. To accomplish this, in some embodiment, natural language processing and a rules engine are applied to assign suggested emphasis categories from a taxonomy that represents different types of semantic nuance, and the emphasis categories are associated with corresponding words from the phrase that are subject to emphasis. In the embodiment illustrated in FIG. 1, text emphasis suggestion service 184 initially triggers linguistic feature detector 186 to identify linguistic features from a selected text phrase, and text emphasis suggestion service 184 applies a rules engine that uses the linguistic features to assign emphasis categories and associate them with corresponding words.

In some embodiments, linguistic feature detector 186 parses a text string into tokens and identifies linguistic features such as part-of-speech (POS), detailed part-of-speech (TAG), dependency relation (DP), and named entity type (NER). For example, a text string may initially be separated into a sequence of "words," where each word consists of one or more tokens. In some embodiments, compound tokens that represent a single semantic concept may be formed (e.g., "$100" which includes both a symbol and a number, initially parsed tokens that join to form a contraction). Generally, any known technique may be applied to detect linguistic features from a text string. As such, linguistic feature detector 186 returns a representation of a linguistic analysis of a text string, which may include various tags (e.g., POS, TAG, DP, NER) and/or a dependency graph of how words in the text string are related to one another.

Upon receipt of the linguistic features, text emphasis suggestion service 184 applies a rules engine that uses the linguistic features to assign emphasis categories and associate them with corresponding candidate words. Generally, any given phrase may have multiple ways to emphasize different words in a way that focuses the audience's attention on different semantic aspects. For example, "The BEACH you should be sitting on now" focuses attention on the subject of the phrase, whereas "The beach you should be sitting on NOW" focuses attention on the temporal aspect of the phrase. To support the different potential ways of emphasizing a phrase, a taxonomy of emphasis categories may be developed. Table 1 below illustrates an example taxonomy of emphasis categories.

TABLE 1

| | |
|---|---|
| kRoot | Emphasize the root element of a phrase |
| kSubject | Emphasize the subject of a phrase |
| kDirectObject | Emphasize the direct object of a phrase |
| kPrepObject | Emphasize the prepositional object of a phrase |
| kActionVerb | Emphasize the action verb of a phrase |
| kAuxVerb | Emphasize the auxiliary verb of a phrase, such as 'has', 'is' |
| kAttributeNoun | Emphasize a noun that describes some entity |
| kAttributeAdjective | Emphasize an adjective that describes some entity |
| kAttributeVerb | Emphasize a verb that describes some entity (not currently used) |
| kAgent | Emphasize the actor whom the sentence is referring to (e.g., 'The beach YOU are sitting on now') |
| kRelation | Emphasize the relationship between elements in a phrase, such as 'and,' 'or' |
| kNumber | Emphasize a number |
| kCurrency | Emphasize currency |
| kInterrogative | Emphasize 'who, what, when, where, how' |
| kAllNouns | Emphasize all the nouns in a phrase |
| kPair | Emphasize a repeating pattern of other emphasis categories |
| kCoreferences | Emphasize words that reference one another within a phrase |

In order to identify emphasis categories that are applicable to a particular phrase, text emphasis suggestion service 184 applies a rules engine, which may comprise a decision tree. In an example embodiment, the rules engine makes a first pass in which each word in the phrase is examined based on its linguistic features and assigned zero or more applicable emphasis categories (e.g., emphasis categories that emphasize a particular part of speech may initially be assigned to words that match that part of speech). In some embodiments, in order to assign zero or more applicable emphasis categories, the rules engine implements a decision tree that includes a set of rules that examine various linguistic features of the words, such as part-of-speech (POS), tag (TAG), dependency relation (DP), and named entity type (NER). In some embodiments, the decision tree first examines the POS of a word, and then uses the other information to assign an emphasis category. In some cases, not all emphasis categories will be applicable to all words or phrases, so some emphasis categories may not be assigned to any words. Similarly, in some cases, emphasis categories are not mutually exclusive, so multiple emphasis categories may be applied to the same word or phrase.

Continuing with an example implementation, after making a first pass an assigning applicable emphasis categories to particular words in the phrase, the rules engine then makes a subsequent pass in which the rules engine looks for more complex emphasis categories, such as recurring linguistic patterns of emphasis categories (e.g. pairs) or all words with a particular tag (e.g., all nouns). For example, the phrase "A small act of kindness makes a big difference" has a recurring pattern of [kAttributeAdjective kAttributeNoun] found in "small act" and "big difference." This pattern may be identified and used to assign the pair of word groups a corresponding emphasis category (e.g., kPair) in order to identify those words for emphasis (e.g., "A SMALL ACT of kindness makes a BIG DIFFERENCE").

As such, text emphasis suggestion service 184 generates emphasis suggestions comprising emphasis categories and associated words from a text string to emphasize. Generally, emphasis categories and associated words may be represented in any suitable manner. For example, an emphasis category may be represented by a tag, symbol, string, integer, or other suitable representation, and corresponding words may be represented by their tokens, location in the text string (e.g., character range), or otherwise. In an embodiment, text emphasis suggestion service 184 returns a list of emphasis categories and corresponding words to text emphasis suggestion tool 120.

Generally, an interaction element provided by text emphasis suggestion tool 120 may accept user input iterating through the emphasis suggestions to preview and/or apply the suggestions to the user's design (e.g., by applying selected and/or suggested primary and secondary text styles). In the embodiment illustrated in FIG. 1, text emphasis suggestion tool 120 provides an emphasis wheel 122 that allows a user to scroll through the emphasis suggestions in an analogous manner as style wheel 116. In the embodiment illustrated in FIG. 2, text styles menu 230 provides a shuffle emphasis button 260 that advances (e.g., linearly or randomly) through the emphasis suggestions with each activation. As the user iterates through the emphasis suggestions, emphasis preview component 124 previews and/or applies the text suggestion to the user's design. For example, for each emphasis suggestion, emphasis preview component 124 reads the representation of the associated words to be emphasized from the emphasis suggestions, identifies the corresponding words from the selected text element, and applies a different text style (e.g., a primary text style) to those words than to the rest of the words in the text element (e.g., a or secondary text style). FIG. 4 illustrates some example text emphasis suggestions and corresponding emphasis categories, in accordance with some embodiments.

Returning to FIG. 2, example user interface 200 illustrates primary 235 and secondary 240 text styles, which may be applied to emphasize different words in selected text element 215. In some embodiments, one or more interaction elements accept user input changing primary 235 and secondary 240 text styles and/or choosing which words to apply which text style. These are just a few examples, and other variations are contemplated within the scope of the present disclosure.

Additionally or alternatively to using emphasis suggestions to apply a visual stylization to text, in some embodiments, collateral suggestion component 126 of text emphasis suggestion tool 120 generates collateral suggestions based on an emphasis suggestion. For example, if a selected emphasis suggestion identifies a particular candidate word for stylization, collateral suggestion component 126 may use the candidate word as a search term to search (e.g., metadata tags in) a collection of non-text collateral assets (e.g., images 196 in storage 190, animations, video clips, etc.), retrieve matching collateral assets, and present a matching asset as a collateral suggestion (e.g., by using a matching image as a background image). In some embodiments, candidate words themselves are used as search terms. In other cases, candidate words or tags can map to representative search terms (e.g., associated with a particular emphasis category). In some embodiments, an interaction element of collateral suggestion component 126 may accept user input iterating through a plurality of collateral suggestions and/or through categories of collateral suggestions.

Figure 5:
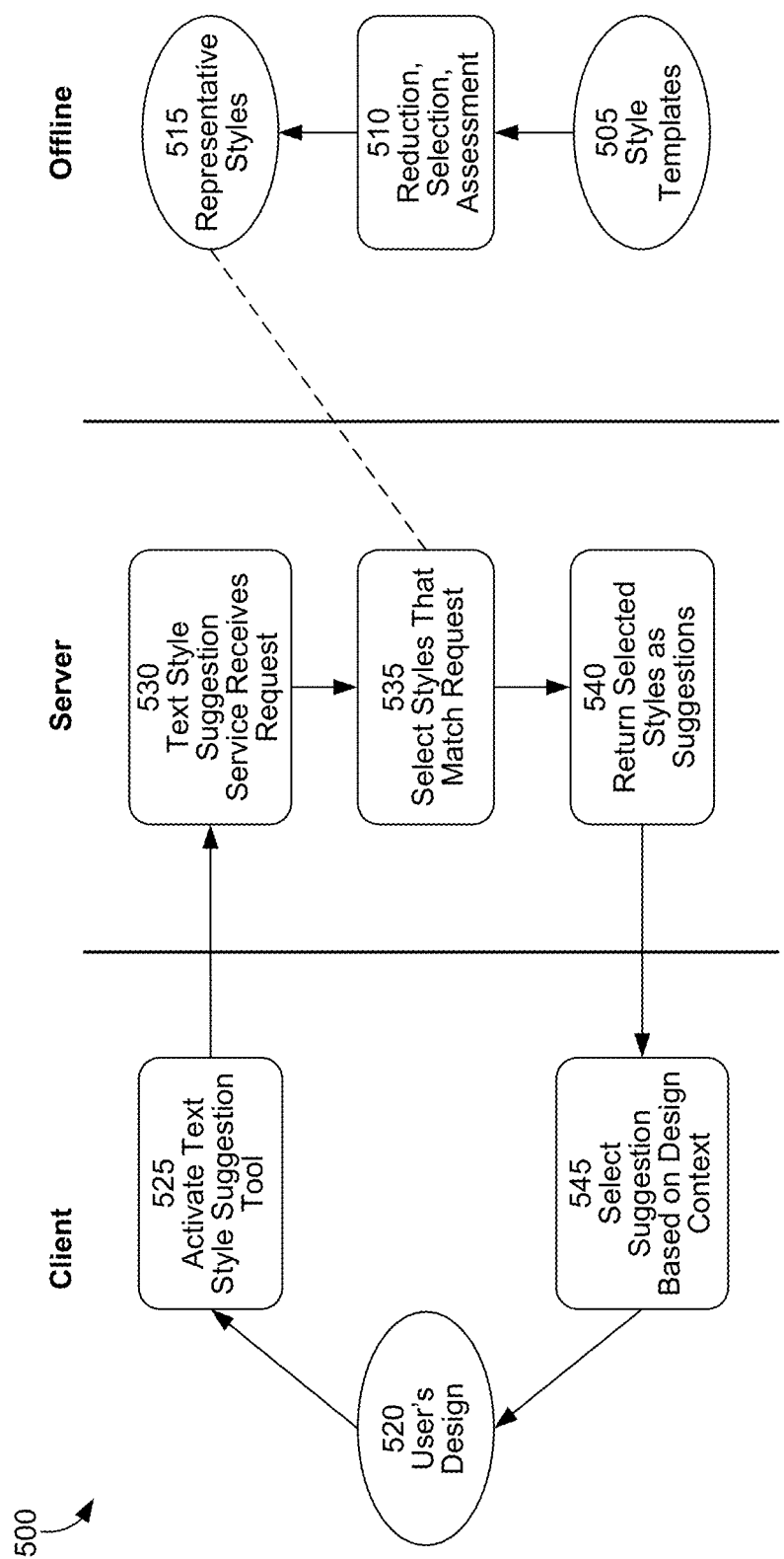
FIG. 5 is a flow diagram showing a method for generating text style suggestions, in accordance with some embodiments.
Figure 6:
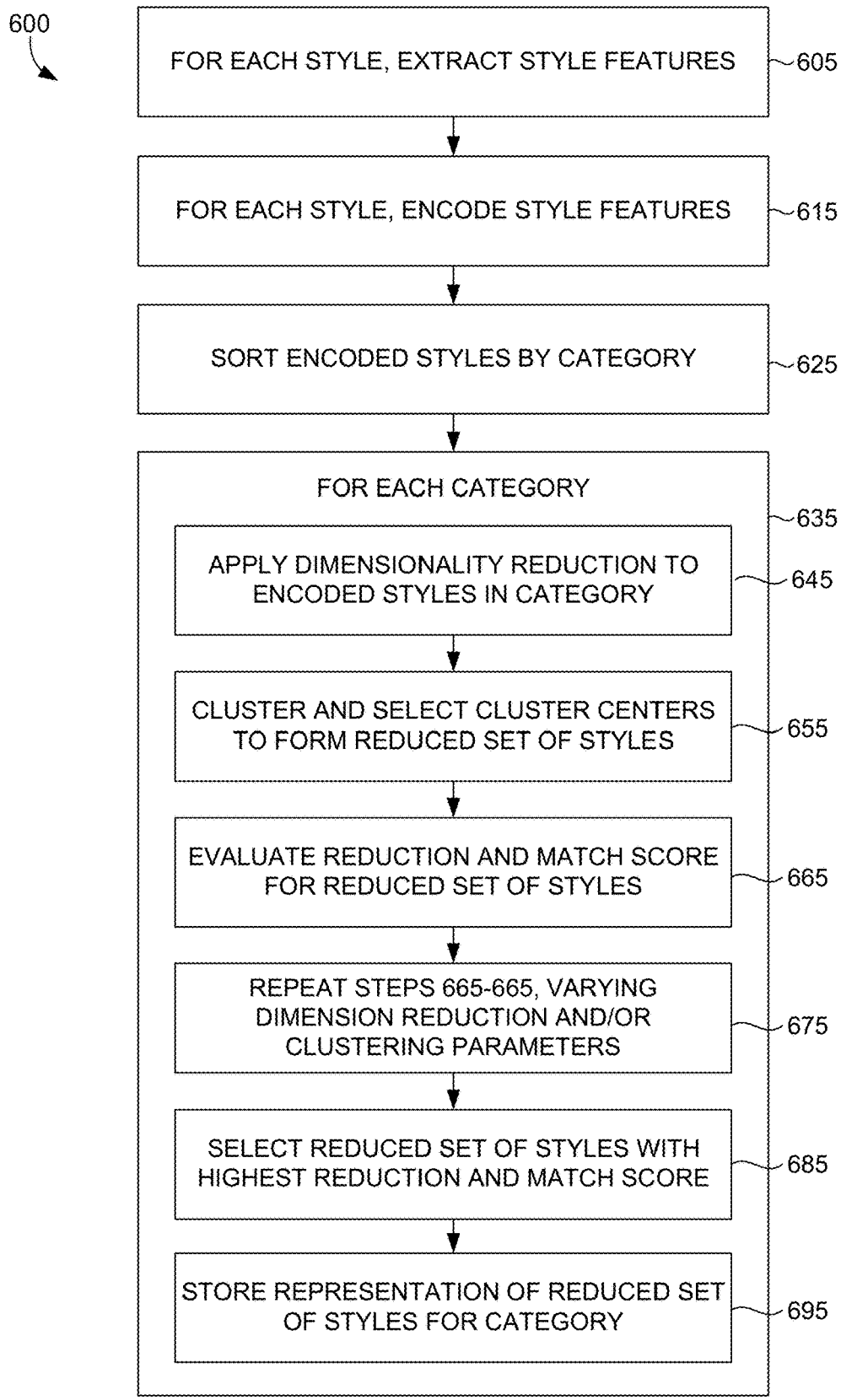
FIG. 6 is a flow diagram showing a method for reduction, selection, and assessment of representative text styles, in accordance with some embodiments.
Figure 7:
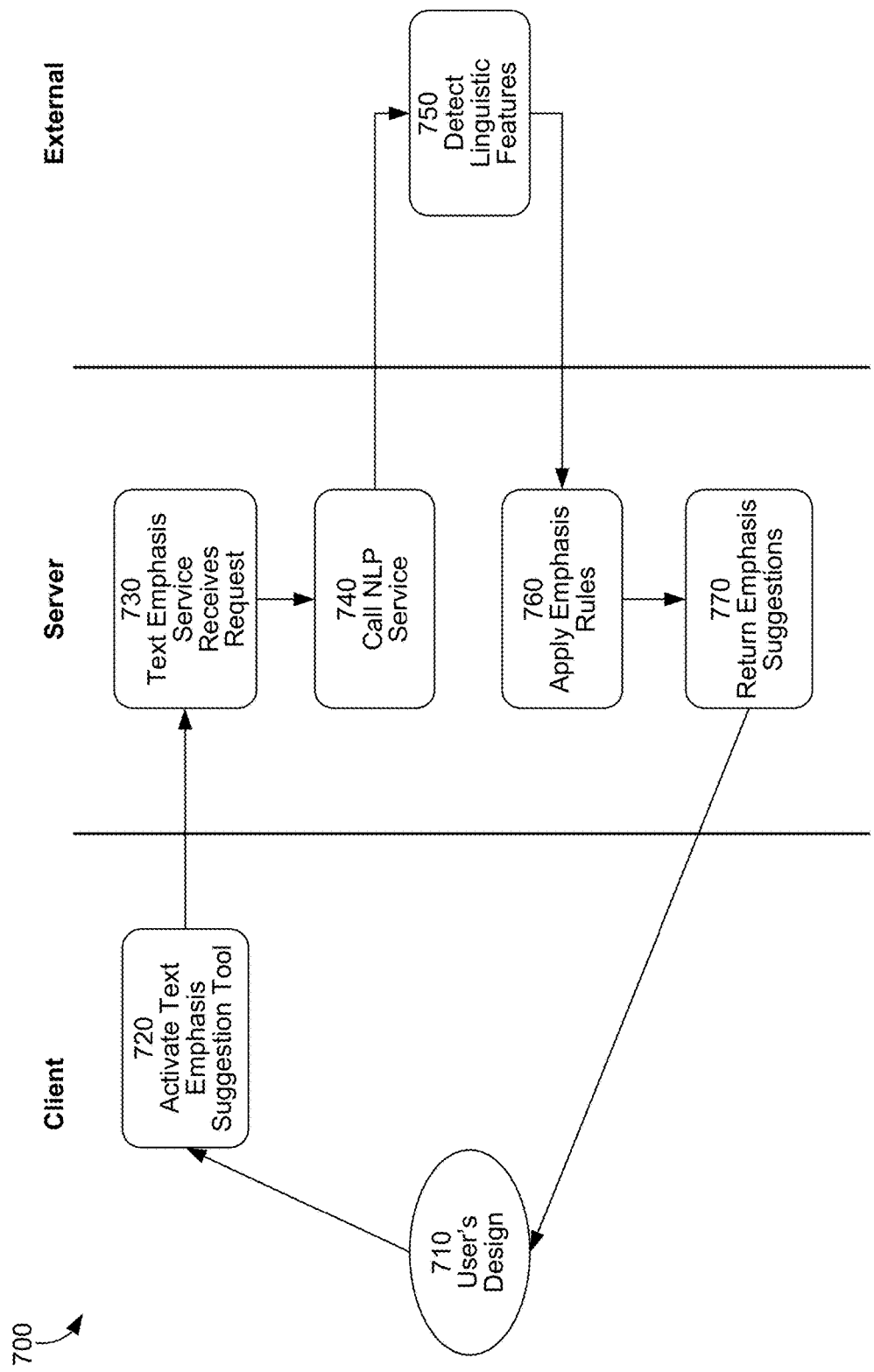
FIG. 7 is a flow diagram showing a method for generating text emphasis suggestions, in accordance with some embodiments.

With reference now to FIGS. 5-7, flow diagrams are provided illustrating methods 500, 600, and 700. Each block of the methods 500, 600, and 700 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 5, FIG. 5 illustrates a method 500 for generating text style suggestions, in accordance with embodiments described herein. At a high-level, FIG. 5 organizes the blocks of method 500 based on the device that performs a corresponding process step (e.g., client vs. server) in this embodiment. Furthermore, in this embodiment, the first three blocks of method 500 are illustrated as being performed offline (i.e., prior to serving a client request).

Initially, method 500 begins with a collection of template text styles 505. In some cases, style collections can grow to large and effectively unmanageable sizes. As such, a desired collection of template text styles 505 is accessed, and at block 510, an iterative process of reduction, selection, and assessment is applied to the style collection to output one or more compressed sets of representative text styles 515. For example, the reduction, selection, and assessment may be performed by representative styles selection component 162 (e.g., control component 170) of FIG. 1. Generally, representative text styles 515 may be made available to the client device and/or server depicted in FIG. 5.

Method 500 continues with user design 520. A user may use a design application (e.g., design application 104 of FIG. 1) to select and/or generate user design 520. At block 525, the user activates a text style suggestion tool (e.g., text style tool 108 or text style suggestion tool 110 of FIG. 1) and selects a text element from user design 520, which generates a request to a text style suggestion service to generate text style suggestions. At block 530, the text style suggestion service (e.g., text style suggestion service 180 of FIG. 1) receives the request and, in response at block 535, selects a set of representative text styles 515 that match the request. At block 540, the text style suggestion service returns the selected set of representative text styles as text style suggestions. At block 545, the style suggestion tool at the client device receives the text style suggestions from the text style suggestion service, performs a contextual analysis to curate the suggestions and identify a set of context-specific text style suggestions (e.g., via style discriminator 116 of FIG. 1), and applies one or more suggestions to user design 520 (e.g., via style preview component 118 of FIG. 1).

Turning now to FIG. 6, FIG. 6 illustrates a method 600 for reduction, selection, and assessment of representative text styles, in accordance with some embodiments. In some embodiments, method 600 corresponds with block 510 of FIG. 5 and illustrates an example technique to reduce a collection of template text styles and select and assess a set of representative styles. Initially at block 605, for each style in the collection, a set of style features are extracted (e.g., by manifest parser 164 of FIG. 1). For example, a manifest that represents each template style may be parsed to extract a desired set of style features. At block 615, the extracted styles features are encoded to generate an encoded style for each template style (e.g., by style encoder 166 of FIG. 1). At block 625, the encoded styles are sorted by category, such as an associated semantic role for the text style (e.g., by control component 170 of FIG. 1). At block 635, a series of steps is performed for each category (e.g., semantic role). More specifically, the steps illustrated in blocks 445-495 are performed for each category of text style.

At block 645, dimensionality reduction is applied to the encoded styles in a particular category (e.g., semantic role) to reduce the dimensionality of each of the encoded styles (e.g., by dimension reduction component 172 of FIG. 1). At block 655, the dimensionality-reduced encoded styles are clustered, and the cluster centers are selected to form a reduced or compressed set of text styles (e.g., by style selection component 174 of FIG. 1). At block 665, the reduced set of styles is evaluated to compute a reduction and match score (e.g., by selection assessment component 176 of FIG. 1). At block 675, blocks 645-665 are repeated, varying dimension reduction and/or clustering parameters, and at block 685, the reduced set of styles with the highest reduction and match score is selected. At block 695, a representation of the reduced set of styles for each category is stored (e.g., as representative styles 194 in storage 190 of FIG. 1).

Turning now to FIG. 7, FIG. 7 illustrates a method for generating text emphasis suggestions, in accordance with some embodiments. At a high-level, FIG. 7 organizes the blocks of method 700 based on the device that performs a corresponding process step (e.g., client vs. server vs. some external service such as a cloud service) in this embodiment.

Initially, method 700 begins with user design 710. Generally, a user may use a design application (e.g., design application 104 of FIG. 1) to select and/or generate user design 710. At block 720, the user activates a text emphasis suggestion tool (e.g., text style tool 108 or text emphasis suggestion tool 120 of FIG. 1) and selects a text element from user design 710, which generates a request to a text emphasis suggestion service to generate text emphasis suggestions for the text string from the text element. At block 730, the text emphasis suggestion service (e.g., text emphasis suggestion service 184 of FIG. 1) receives the request and, in response at block 540, calls an external natural language processing service (e.g., with functionality corresponding to linguistic feature detector 186 of FIG. 1). In response at block 550, the natural language processing service detects and returns linguistic features of the text string (e.g., of words or compound tokens in the text string). At block 560, the text emphasis suggestion service applies a set of emphasis rules that examine the linguistic features to assign zero or more emphasis categories to each word in the text string based on the linguistic features. At block 570, a list or other representation of the applicable emphasis categories and associated words in the text string are returned to the text style tool, which applies one or more emphasis suggestions to user design 710 (e.g., via emphasis preview component 124 of FIG. 1).

Example Operating Environment

Figure 8:
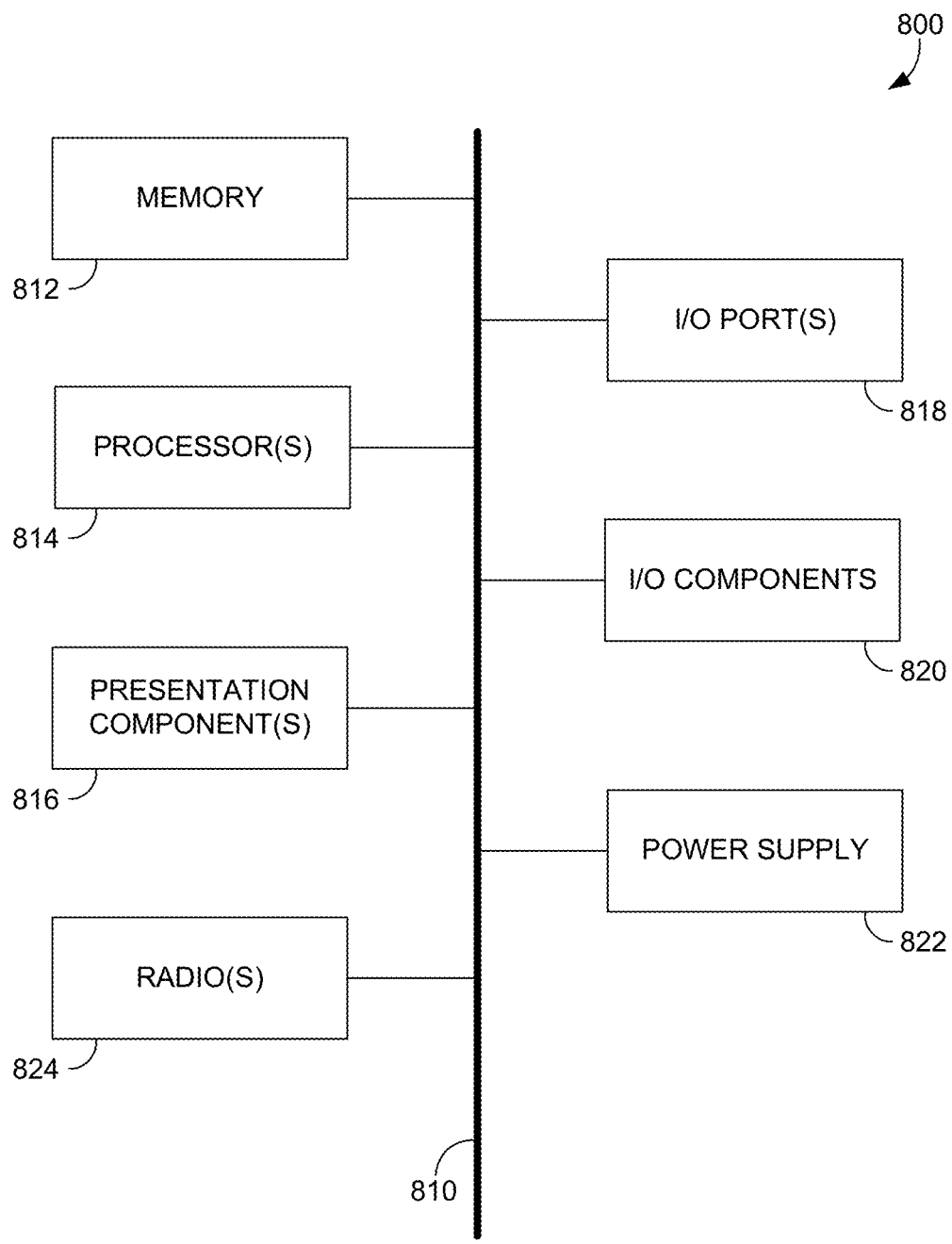
FIG. 8 is a block diagram of an example computing environment suitable for use in implementing some embodiments.

Having described an overview of embodiments of the present invention, an example operating environment in which embodiments of the present invention may be implemented is described below in order to provide a general context for various aspects of the present invention. Referring now to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Example hardware devices include solid-state memory, hard drives, optical-disc drives, etc. Computing device 800 includes one or more processors that read data from various entities such as memory 812 or I/O components 820. Presentation component(s) 816 present data indications to a user or other device. Example presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 800. Computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of computing device 800 to render immersive augmented reality or virtual reality.

Embodiments described herein support generation of text style suggestions and/or text emphasis suggestions. The components described herein refer to integrated components of a suggestion system. The integrated components refer to the hardware architecture and software framework that support functionality using the suggestion system. The hardware architecture refers to physical components and inter-relationships thereof and the software framework refers to software providing functionality that can be implemented with hardware embodied on a device.

The end-to-end software-based suggestion system can operate within the suggestion system components to operate computer hardware to provide suggestion system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the suggestion system components can manage resources and provide services for the suggestion system functionality. Any other variations and combinations thereof are contemplated with embodiments of the present invention.

A neural network refers to a machine-learning model that learns to approximate unknown functions by analyzing example (e.g., training) data at different levels of abstraction. Generally, neural networks can model complex nonlinear relationships by generating hidden vector outputs along a sequence of inputs. In particular, a neural network can include a model of interconnected digital neurons that communicate and learn to approximate complex functions and generate outputs based on a plurality of inputs provided to the model. A neural network can include a variety of deep learning models, including convolutional neural networks, recurrent neural networks, deep neural networks, and deep stacking networks, to name a few examples. A neural network may include or otherwise make use of one or more machine learning algorithms to learn from training data. In other words, a neural network can include an algorithm that implements deep learning techniques such as machine learning to attempt to model high-level abstractions in data.

Although some implementations are described with respect to neural networks, generally embodiments may be implemented using any type of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method comprising:
  receiving, in an electronic design application, an input activating a text style suggestion tool in association with a selected text element in an electronic design;
  accessing, by the text style suggestion tool, an initial set of text style suggestions for the selected text element;
  executing a simulation that generates simulated text style suggestions representing the initial set of text style suggestions being applied to the selected text element;
  curating, by the text style suggestion tool, the initial set of text style suggestions into a set of contextual text style suggestions based on a contextual analysis checking for collisions with the simulated text style suggestions, alignment consistency between the simulated text style suggestions and other elements in the electronic design, and readability of the simulated style text suggestions; and
  applying, by the text style suggestion tool, one of the contextual text style suggestions to the selected text element in the electronic design.

2. The computerized method of claim 1, further comprising:
  collecting, by the text style suggestion tool, metadata comprising position, semantic role, and font features of the selected text element; and
  retrieving the initial set of text style suggestions by providing a representation of the metadata with a call to a text style suggestion service configured to return the initial set of text style suggestions.

3. The computerized method of claim 1, further comprising retrieving the initial set of text style suggestions by calling a text style suggestion service configured to select the initial set of text style suggestions from a set of representative text styles generated based on applying dimension reduction to text style encodings.

4. The computerized method of claim 1, further comprising retrieving the initial set of text style suggestions by calling a text style suggestion service configured to select the initial set of text style suggestions from a set of text styles using a neural network to predict compatibility scores.

5. The computerized method of claim 1, further comprising executing the contextual analysis by:
  quantifying any detected collisions with the simulated text style suggestions;
  assessing the alignment consistency between the simulated applied text style suggestions and the other elements in the electronic design;
  quantifying the readability of the simulated text style suggestions; and
  omitting or modifying a subset of text style suggestions from the initial set based on the detected collisions, the alignment consistency, or the readability.

6. The computerized method of claim 1, further comprising causing presentation of a style wheel configured to iterate through the contextual text style suggestions in response to an input rotating through successive rotational increments around the style wheel.

7. The computerized method of claim 1, further comprising:
iterating through the contextual text style suggestions; and
upon running out of the contextual text style suggestions, calling a text style suggestion service to retrieve a subsequent set of text style suggestions for the selected text element.

8. One or more computer storage media storing computer-useable instructions that, when used by one or more computing devices, cause the one or more computing devices to perform operations comprising:
receiving, in an electronic design application, an input activating a text style suggestion tool in association with a selected text element in an electronic design;
accessing, by the text style suggestion tool, an initial set of text style suggestions for the selected text element;
executing a simulation that generates simulated text style suggestions representing the initial set of text style suggestions being applied to the selected text element;
curating, by the text style suggestion tool, the initial set of text style suggestions into a set of contextual text style suggestions by executing a contextual analysis assessing collisions with the simulated text style suggestions, alignment consistency between the simulated text style suggestions and other elements in the electronic design, and readability of the simulated style text suggestions; and
applying, by the text style suggestion tool, one of the contextual text style suggestions to the selected text element in the electronic design.

9. The one or more computer storage media of claim 8, the operations further comprising:
collecting, by the text style suggestion tool, metadata comprising position, semantic role, and font features of the selected text element; and
retrieving the initial set of text style suggestions by providing a representation of the metadata with a call to a text style suggestion service configured to return the initial set of text style suggestions.

10. The one or more computer storage media of claim 8, the operations further comprising retrieving the initial set of text style suggestions by calling a text style suggestion service configured to select the initial set of text style suggestions from a set of representative text styles generated by:
accessing an initial collection of text styles;
generating text style encodings by, for each text style in the initial collection, extracting style features from a manifest representing the text style and generating a text style encoding from the style features;
generating a plurality of candidate sets of representative text styles by iteratively (i) applying dimension reduction to the text style encodings to form reduced dimension text style encodings, and (ii) selecting a corresponding candidate set of representative text styles from clusters of the reduced dimension text style encodings; and
selecting the set of representative text styles from the plurality of candidate sets of representative text styles.

11. The one or more computer storage media of claim 8, the operations further comprising retrieving the initial set of text style suggestions by calling a text style suggestion service configured to select the initial set of text style suggestions from a set of text styles by:
using a neural network to predict compatibility scores for the text styles in the set from a representation of contextual metadata about the selected text element; and
selecting a subset of the text styles as the initial set of text style suggestions based on the text styles in the subset having highest ranked scores of the compatibility scores.

12. The one or more computer storage media of claim 8, wherein executing the contextual analysis comprises:
quantifying the collisions with the simulated text style suggestions;
assessing the alignment consistency between the simulated text style suggestions and the other elements in the electronic design;
quantifying the readability of the simulated text style suggestions; and
omitting or modifying a subset of text style suggestions from the initial set based on the collisions, the alignment consistency, or the readability.

13. The one or more computer storage media of claim 8, the operations further comprising causing presentation of a style wheel configured to iterate through the contextual text style suggestions in response to an input rotating through successive rotational increments around the style wheel.

14. The one or more computer storage media of claim 8, the operations further comprising:
iterating through the contextual text style suggestions; and
upon running out of the contextual text style suggestions, calling a text style suggestion service to retrieve a subsequent set of text style suggestions for the selected text element.

15. The one or more computer storage media of claim 8, the operations further comprising, in response to detecting a change to the selected text element, calling a text style suggestion service to retrieve a subsequent set of text style suggestions.

16. A computer system comprising:
one or more hardware processors and memory configured to provide computer program instructions to the one or more hardware processors; and
a text style suggestion tool configured to use the one or more hardware processors to perform operations comprising:
accessing an initial set of text style suggestions for a selected text element;
executing a simulation that generates simulated text style suggestions representing the initial set of text style suggestions being applied to the selected text element;
curating the initial set of text style suggestions into a set of contextual text style suggestions based on a contextual analysis that checks for collisions with the simulated text suggestions, alignment consistency between the simulated text suggestions and other elements, and readability of the simulated text suggestions; and
applying one of the contextual text style suggestions to the selected text element.

17. The computer system of claim 16, the operations further comprising:
collecting metadata comprising position, semantic role, and font features of the selected text element; and
retrieving the initial set of text style suggestions by providing a representation of the metadata with a call to a text style suggestion service configured to return the initial set of text style suggestions.

18. The computer system of claim 16, the operations further comprising retrieving the initial set of text style suggestions by calling a text style suggestion service configured to select the initial set of text style suggestions from a set of representative text styles generated based on applying dimension reduction to text style encodings.

19. The computer system of claim 16, the operations further comprising retrieving the initial set of text style suggestions by calling a text style suggestion service configured to select the initial set of text style suggestions from a set of text styles using a neural network to predict compatibility scores for the text styles.

20. The computer system of claim 16, wherein the contextual analysis comprises:
- quantifying any detected collisions with the simulated text style suggestions;
- assessing the alignment consistency between the simulated text style suggestions and the other elements;
- quantifying the readability of the simulated text style suggestions; and
- omitting or modifying a subset of text style suggestions from the initial set based on the detected collisions, the alignment consistency, or the readability.

* * * * *

UNITED STATES PATENT AND TRADEMARK OFFICE
CERTIFICATE OF CORRECTION

PATENT NO. : 11,423,206 B2
APPLICATION NO. : 17/090055
DATED : August 23, 2022
INVENTOR(S) : William Frederick Kraus, Nathaniel Joseph Grabaskas and Ajinkya Kale It is certified that error appears in the above-identified patent and that said Letters Patent is hereby corrected as shown below:

In the Claims

Column 22
Line 61, In Claim 5, delete "applied text" and insert -- text --.

Signed and Sealed this
Twentieth Day of December, 2022

*Katherine Kelly Vidal*

Katherine Kelly Vidal
*Director of the United States Patent and Trademark Office*